Patented Dec. 22, 1953

2,663,710

UNITED STATES PATENT OFFICE 2,663,710

SERIES OF NITROFURAN COMPOUNDS COMPRISING 5-NITRO-2-FURYL 2-DIALKYL-AMINOALKYL KETONE SEMICARBAZONE SALTS

Kenyon J. Hayes, Norwich, N. Y., assignor to Eaton Laboratories, Inc., Norwich, N. Y., a corporation of New York No Drawing. Application May 29, 1950,
Serial No. 165,096

5 Claims. (Cl. 260—293.4)

This invention relates to a new series of chemotherapeutically active nitrofuran derivatives possessing high water solubility. This is in contrast to other chemotherapeutically active nitrofuran compounds, previously disclosed, which had a low solubility in water and other physiologically compatible solvents and, thus, were not suitable for administration by the parenteral route.

This series includes a number of closely related new compositions of matter which are referred to by the generic name 5-nitro-2-furyl 2-dialkyl-aminoalkyl ketone semicarbazone salts. They are represented by the general structural formula:

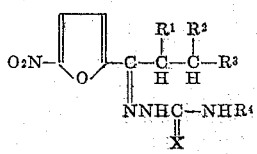

in which:

$R^1$=hydrogen or a lower alkyl group.
$R^2$=hydrogen or a lower alkyl group.
$R^3$=a group containing as a soluble acid salt a tertiary nitrogen atom in a cyclized ring or having linked thereto 2 lower alkyl groups.
$X$=O or S.
$R^4$=hydrogen, a lower alkyl, lower hydroxyl alkyl or lower amino alkyl group when $X=O$, and when $X=S$ $R^4$=hydrogen or a lower alkyl group.

These substances may be conveniently prepared in a two-step process by conventional reactions. A 5-nitro-2-furyl alkyl ketone, bearing two or more hydrogen atoms on the carbon atom alpha to the carbonyl group, may be caused to undergo a Mannich reaction with a simple aliphatic aldehyde and a secondary amine salt by proper choice of reaction conditions. The resulting 5-nitro-2-furyl 2-dialkylaminoalkyl ketone salt may then be condensed with the desired semicarbazide or thiosemicarbazide in slightly acid media to yield a compound of the type embraced within the above formula.

In order that the invention may be entirely available to those skilled in the art, methods for making some of the new compounds are described briefly:

EXAMPLE 1

*5-nitro-2-furyl β-(1-piperidino) ethyl ketone semicarbazone hydrochloride*

A mixture of 3.1 gms. of pure 5-nitro-2-furyl methyl ketone and 2.68 gms. of piperidine hydrochloride and 1.0 gm. of paraformaldehyde in 15 cc. of n-propanol containing 3 drops of concentrated hydrochloric acid was refluxed one hour, a further quantity (0.5 gm.) of paraformaldehyde was added and refluxing continued for a total of five hours. The suspension was cooled, 50 cc. of ether added and the precipitated solid was filtered.

The crude product was crystallized from an ethanol-water mixture (80:30, 10 cc. per gram) to yield 2.36 gm. of pure 5-nitro-2-furyl β-(1-piperidino) ethyl ketone hydrochloride. Melting point 206-8° C. with decomposition. Yield 41%. Analyzed for chlorine: calculated, 12.3% Cl; found, 12.6% Cl.

The semicarbazone of this ketone is readily prepared by partial evaporation of a solution of equimolar amounts of (A) 5-nitro-2-furyl β-(1-piperidino) ethyl ketone hydrochloride and (B) semicarbazide hydrochloride. 10 parts of A, 3.86 parts of B in 385 parts of water. Yellow needles, highly soluble in water, M. P. 220-222° C. with decomposition.

EXAMPLE 2

*5-nitro-2-furyl β-(1-piperidino) ethyl ketone 4-β-hydroxyethyl semicarbazone hydrochloride*

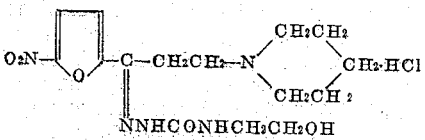

A mixture of 2.90 grams of 5-nitro-2-furyl β-(1-piperidino) ethyl ketone, as prepared in Example 1, and 1.56 grams of 4-(2-hydroxyl-ethyl) semicarbazide hydrochloride [prepared by heating acetophenone semicarbazone with ethanolamine at 150°, hydrolysing with hydrochloride acid and concentrating to dryness after removal of the acetophenone] in 50 cc. of 85% aqueous ethanol is heated at 60° C. for fifteen minutes. The solution is then evaporated to dryness at room temperature and the crude yellow solid recrystallized from 95% ethanol. Yield 3.54 grams (88%) of melting point 207.5–208° C. with decomposition.

EXAMPLE 3

*5-nitro-2-furyl β-dimethylaminoethyl ketone semicarbazone hydrochloride*

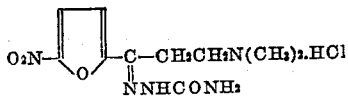

A mixture of 3.88 grams of 5-nitro-2-furyl methyl ketone, 2.10 grams of dimethylamine hydrochloride and 1.15 grams of paraformaldehyde in 10 cc. of iso-amyl alcohol containing three drops of concentrated hydrochloric acid is refluxed for one hundred minutes. The mixture is cooled and diluted with 20 cc. of acetone. The white solid is filtered and dried at 110° C. The yield is 1.93 grams of white crystals of melting point 195–200° C., with decomposition. This crude Mannich ketone is purified by solution in a minimum quantity of water, decolorizing with charcoal, followed by evaporation at room temperature to one-third volume. The white solid is filtered and washed with absolute ethanol. Recovery is 1.82 grams of white crystals of melting point 201–202° C., with decomposition. Analysis: calculated for $C_9H_{13}N_2O_4Cl$; 43.4% C, 5.26% H; found; 43.5% C, 5.42% H.

Two hundred milligrams of the Mannich ketone, prepared above, is dissolved in 3 cc. of water and is treated at room temperature with a small excess of semicarbazide hydrochloride. The solution slowly becomes yellow and is evaporated to dryness at room temperature. The yellow crystals obtained are triturated with 1 cc. of water, filtered and washed with 3 cc. of absolute ethanol. The yield is 210 mgm. of yellow crystals of melting point 214–215° C., with decomposition. Analysis: calculated for $C_{10}H_{16}N_5O_4Cl$; 22.9% N: found; 23.18% N.

EXAMPLE 4

*5-nitro-2-furyl β-(1-piperidino) ethyl ketone thiosemicarbazone hydrochloride*

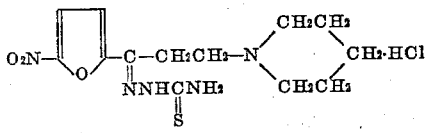

One hundredth of a mole (2.89 grams) of 5-nitro-2-furyl β-(1-piperidino) ethyl ketone hydrochloride, as prepared for Example 1, and a molar equivalent (0.91 grams) of thiosemicarbazide are heated to 60° C. in 70 cc. of 70% ethanol containing 1 cc. of 4.5 N hydrochloric acid. The yellow solution is then evaporated to dryness at room temperature. The crude orange solid is purified by recrystallization from 50 cc. of 70% ethanol, using charcoal. The yield is 1.70 grams of melting point 193–194° C., with decomposition. Analysis: calculated for $C_{13}H_{20}N_5O_3SCl$; 19.35% N: found; 19.29% N.

What I claim is:

1. A compound having chemotherapeutic activity and high water solubility, and represented by the formulae:

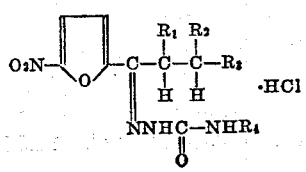

and

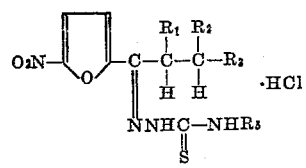

in which:
$R_1$ represents a member of the group consisting of hydrogen and lower alkyl
$R_2$ represents a member of the group consisting of hydrogen and lower alkyl
$R_3$ represents a member of the group consisting of di-lower alkylamino and piperidyl radicals
$R_4$ represents a member of the group consisting of hydrogen, lower alkyl, lower hydroxy alkyl and lower amino alkyl
$R_5$ represents a member of the group consisting of hydrogen and lower akyl.

2. 5-nitro-2-furyl β-(1-piperidino) ethyl ketone semicarbazone hydrochloride.

3. 5-nitro-2-furyl β-(1-piperidino) ethyl ketone 4-β-hydroxyethyl semicarbazone hydrochloride represented by the formula:

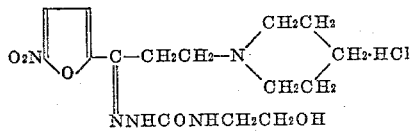

4. 5-nitro-2-furyl β-dimethylaminoethyl ketone semicarbazone hydrochloride represented by the formula:

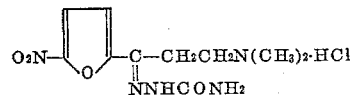

5. 5-nitro-2-furyl β-(1-piperidino) ethyl ketone thiosemicarbazone hydrochloride represented by the formula:

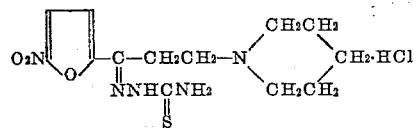

KENYON J. HAYES.

References Cited in the file of this patent

UNITED STATES PATENTS

| Number | Name | Date |
|---|---|---|
| 2,416,235 | Steelman et al. | Feb. 18, 1947 |
| 2,416,237 | Steelman et al. | Feb. 18, 1947 |
| 2,416,239 | Steelman et al. | Feb. 18, 1947 |

OTHER REFERENCES

Paul et al.: Jour. Pharm. and Exp. Therapeu., (February 1950, pp. 153–7).

Dreizen: J. of Dental Research, vol. 28, No. 3, June 1949, pp. 288–298.